Figure 1:
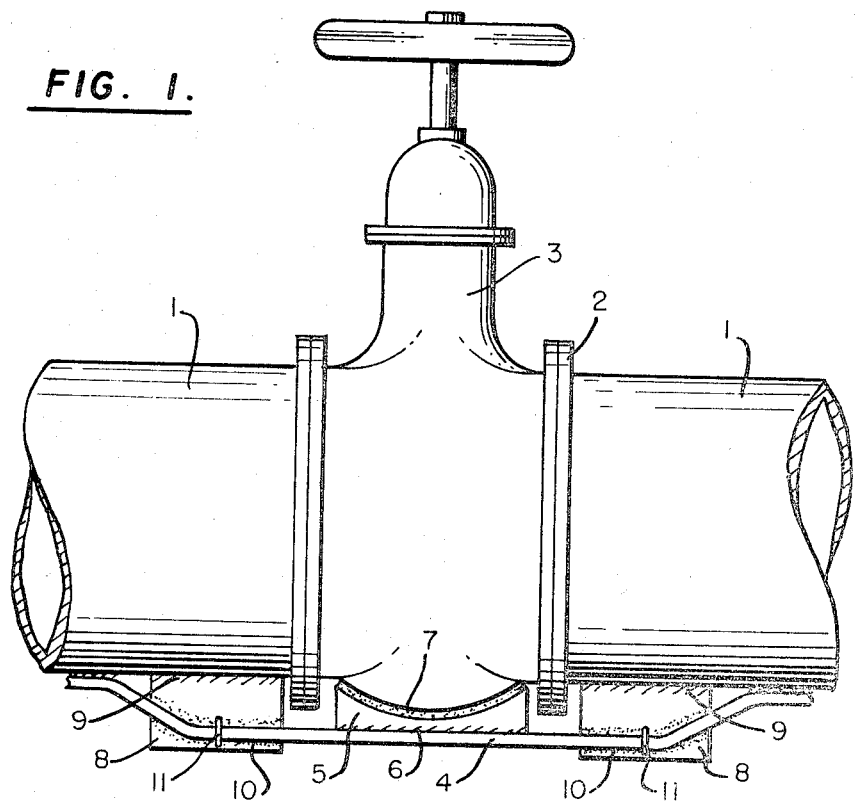

United States Patent

[11] 3,552,482

| [72] | Inventor | Masao Ando<br>Kanagawaken, Japan |
|------|----------|----------------------------------|
| [21] | Appl. No. | 790,329 |
| [22] | Filed | Jan. 10, 1969 |
| [45] | Patented | Jan. 5, 1971 |
| [73] | Assignee | Chisso Corporation<br>Osaka, Japan<br>an organization of Japan |
| [32] | Priority | Jan. 31, 1968 |
| [33] | | Japan |
| [31] | | No. 43/5924 |

[54] METHOD FOR HEATING ARTICLES HAVING COMPLICATED FORMS
2 Claims, 2 Drawing Figs.

[52] U.S. Cl. ..................................................... 165/1, 165/164

[51] Int. Cl. ..................................................... F28d 7/02
[50] Field of Search ........................................ 165/1, 164, 172, 171, 186

[56] References Cited
UNITED STATES PATENTS
3,331,946  7/1967  Bilbro ........................... 165/164
FOREIGN PATENTS
1,445,883  6/1966  France ......................... 165/164

Primary Examiner—Charles Sukalo
Attorney—Fred C. Philpitt

ABSTRACT: Method for heating an article having a part of complicated form by a tracing pipe which comprises causing heat to conduct through the medium of metal piece fixed between said article and said tracing pipe.

PATENTED JAN 5 1971  3,552,482

METHOD FOR HEATING ARTICLES HAVING COMPLICATED FORMS

This invention relates to a method for heating an article having a part of complicated form and more particularly to a method for heating an article having a part of complicated form such as a pipe line equipped with a part of complicated form such as valves, flanges, pumps, etc. a storage vessel, a reactor, etc. by the use of a tracing pipe (an embracing pipe) heated by electric heat, fluid such as steam, heating oil, etc. which is characterized in causing heat to conduct through the medium of metal piece between the material to be heated and the tracing pipe for heating purpose.

It is a common practice to transport a liquid having a high viscosity such as fuel heavy oil through a pipe line by heating said liquid to a temperature which gives a sufficient low viscosity.

In order to prevent the reduction of liquid temperature in such a case, the pipe line is insulated and in case of a long distance pipe line, beside the insulation, a tracing pipe in which fluid such as steam, heating oil or the like, as a heating source, is passing or a tracing pipe which utilizes electric heat, is used.

As a tracing pipe, a steel pipe such as a gas pipe is used from the economical reason, but it has high rigidity and inferior processability. Accordingly, in complicated parts such as flange parts, valves, it is difficult to bring the parts to be heated close enough to the tracing pipe by which mutual heat conduction is prevented and heating and temperature maintenance become difficult.

In order to overcome such a drawback and enhance heat conduction, it has been commonly carried out to fill a certain kind of heat-conducting cement between the gap formed between them.

However, such a heat-conducting cement has drawbacks in the points that its heat conductivity is relatively so low that it is in an extent of 10 Kcal./m hr. °C. and its cost is expensive.

An object of the present invention is to provide a method which overcomes the above-mentioned drawback of the conventional method.

The above-mentioned object of the present invention can be attained by the method of the present invention which is characterized in causing heat to conduct by the medium of metal piece fixed between to be heated material and a tracing pipe in case of to be heated materials having a part of a complicated form.

The method of the present invention can be more fully understood by referring to the accompanied drawings.

Figure 2:
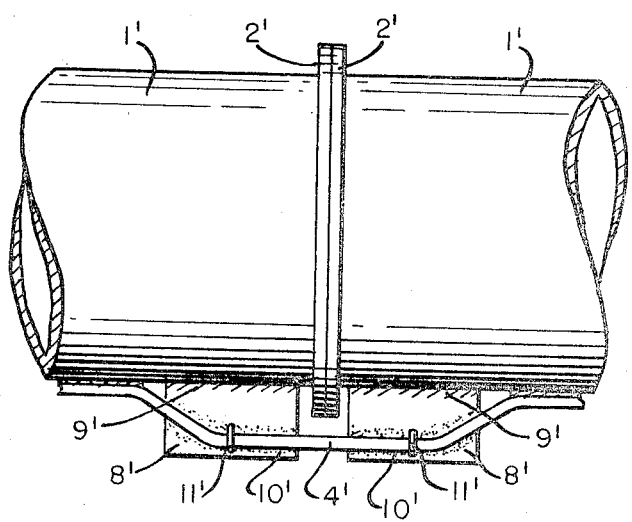

Both FIG. 1 and FIG. 2 are schematic view of a pipe line in which the heating method of the present invention is applied.

In FIG. 1, 1 is a pipe to be heated and whose temperature is maintained by a tracing pipe 4. In the drawing, insulating layers are omitted. 2 is a flange and 3 is a valve. On account of irregular forms of the pipe line at these parts, the close placement or contact of the pipe 1 and the valve 3 to the tracing pipe 4 is difficult, and the mutual heat conduction between the pipe 1 and the valve 3 and the tracing pipe 4 is prevented. In case where the pipe 1 and the tracing pipe 4 are steel pipes, steel plates 8 of similar material are welded as indicated by 9 to the pipe 1 at the part of the flange 2 and the thickness of the steel plate 8 is determined so as to conduct heat from the tracing pipe 4 to the pipe 1 mainly through the steel plate 8. Since the thermal conductivity of steel plate is about 50 Kcal./m hr. °C., it is higher than that of a heat-conducting cement, less expensive and of higher mechanical strength. When the contact of the tracing pipe 4 and the steel plate 8 is not sufficient, it is possible to use a small amount of a heat-conducting cement at this part.

With regard to the heat conduction between the valve 3 and the tracing pipe 4, since the valve 3 is mostly of casted material to which application of welding is difficult and which has the danger of deformation and damage, steel plate 5 of similar material is welded as indicated by 6 to the tracing pipe 4 when the tracing pipe 4 is made of steel and the thickness of the steel plate 5 is determined in such a way that the heat conduction between the valve 3 and the tracing pipe 4 is carried out mainly through the steel plate 5. Since the valve 3 has generally a complicated surface, the part of the steel plate 5 and the valve 3 which are located at mutually close positions, should be machined so as to give as narrow gaps as possible. It is often effective to use a small amount of heat-conducting cement 7 in such gaps.

11 is a mean such as an U-shaped bolt which is used to fix the tracing pipe 4 to the steel plate 8 and has no direct connection to the present invention.

In case where two pipes are connected by flanges, they take forms such as that indicated in FIG. 2, but this case can be considered to be the one of FIG. 1 from which the valve 3, the tracing pipe 4, the steel plate 5, the welded part 6 which connects these parts and the heat-conducting cement 7 used in the gap between the valve 3 and the steel plate 5, are removed. Accordingly, the explanation will be the same as in the case of FIG. 1 if the explanation as to the above-mentioned parts is omitted.

Further since the steel plates 5 or 8 has the object of conducting heat from the tracing pipe 4 to the valve 3 or the pipe 1, it is possible or rather preferable to use a metal other than steel which has better conductivity. As for the fitting method of the tracing pipe 4 and the valve 3 or the pipe 1, various suitable method can be applied according to the parts.

The foregoing explanation is directed to valve flange parts in a pipe line, but with regard to a pump, a metering instrument such as a flow meter or the like, a storage vessel, a reactor, etc., the same application can be carried out.

According to the method of the present invention, even in a pipe line equipped with a valve, flanges, pumps, etc., a complicated part such as a storage vessel, a reactor, etc., the object of economical heating without subjecting a tracing pipe to complicated working or using a large quantity of expensive heat-conducting cement can be attained. The advantage obtained by the method of the present invention in various field of industry will be enormous.

I claim:

1. In the known method of heating a pipeline by disposing a tracing pipe heat source adjacent to said pipeline, the improvement which comprises, making the heat transfer more efficient at a pipeline location of complicated form by:
   a. disposing a metal plate adjacent to the portion of the pipeline that has a complicated form;
   b. welding one side of said metal plate to said tracing pipe; and
   c. connecting the other side of said metal plate to said area of the pipeline that is of complicated form by filling the space therebetween with heat conducting cement, said other side of said metal plate having a shape that generally corresponds to the shape of the pipeline at said location of complicated form.

2. In the known method of heating a pipeline by disposing a tracing pipe heat source adjacent to said pipeline, the improvement which comprises, making the heat transfer more efficient at a pipeline location of complicated form by:
   a. disposing a metal plate adjacent to the portion of the pipeline that has a complicated form;
   b. welding one side of said metal plate to said pipeline adjacent said location of complicated shape; and
   c. connecting the other side of said metal plate to the tracing pipe by filling the space therebetween with heat conducting cement.